Feb. 12, 1935. K. E. STANT 1,990,621
CLOSURE CAP
Filed Dec. 5, 1932   2 Sheets-Sheet 1

INVENTOR.
Kyle E Stant

Feb. 12, 1935.　　　K. E. STANT　　　1,990,621
CLOSURE CAP
Filed Dec. 5, 1932　　2 Sheets-Sheet 2

INVENTOR.
Kyle E Stant

Patented Feb. 12, 1935

1,990,621

UNITED STATES PATENT OFFICE 1,990,621

CLOSURE CAP

Kyle E. Stant, Connersville, Ind.

Application December 5, 1932, Serial No. 645,770

6 Claims. (Cl. 220—40)

The main object of this invention is the provision of a filler cap having interchangeable bayonet locking members whereby one filler cap may be fitted to one or more sizes of bayonet type filler spouts.

Another object is to provide an auxiliary locking member which may be easily and quickly attached and detached to a smaller size locking and driving member forming an original part of the filler cap.

Still another object is the provision of an auxiliary locking member having cooperating means with the original locking and driving member of a filler cap whereby rotation of the auxiliary locking member is prevented with respect to the filler cap.

A still further object is the provision of a means for closing the vent in a filler cap if required, when attaching the auxiliary locking member to the cap.

Figure 1:
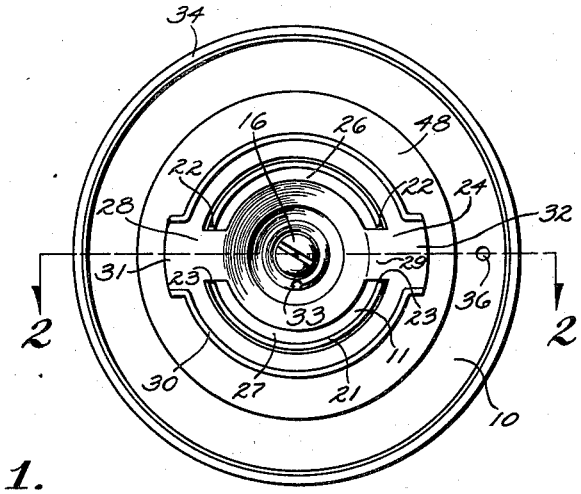
Fig. 1 is a bottom plan view of the device with an adapter in place.

Referring to the drawings more in detail, the device consists of a plate 10, the locking and driving cup 11 and suitable means 12 passing through them to fasten them rigidly and permanently together, in the present instance the fastening means is the square rivet 12 passing through the square holes 13 and 14. The rivet 12 is provided with a tapped hole 15 to receive the screw 16. The rivet 12 also has thereon the enlarged head 17 providing a sealing surface for the gasket 18. The cup 11 is provided with ears 19 and 20 formed from the side wall or skirt portion 21. When the ears 19 and 20 are formed the shoulders 22 and 23 are left, the use of the shoulders 22 and 23 will be hereinafter set forth. The adapter 24 has therein a hole 25 through which the screw 16 passes to clamp the adapter to rivet 12 and cup 11. Also provided on the adapter 24 are the arcuate slots 26 and 27 through which the skirt portions 21 of the cup 11 pass. Dividing the slot 26 from slot 27 are the driving portions 28 and 29 which are adapted to fit between the shoulders 22 and 23 of the cup 11 thus forming a solid driving connection between the adapter and the plate 10. The adapter 24 is also provided with a bent down skirt portion 30 out of which are formed the ears 31 and 32. The central portion of the adapter is formed in a flat surface through which is punched the screw hole 25 and a vent hole 33. Surrounding the plate 10 and affixed permanently and rigidly thereto is the ornamental cover 34 which also forms the cavity 35. This cavity is important to the correct performance of the device when it is used as a gasoline closure cap, and it is required that the cap be vented as is common knowledge to the trade. The vent arrangement is completed by the hole 36 in the plate 10 and the hole 37 drilled through the cup, rivet and plate.

Figure 10:
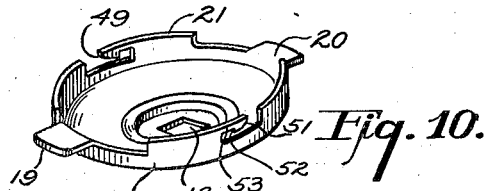
Fig. 10 is a perspective view showing a variation of the locking and driving cup of Fig. 6.
Figure 11:
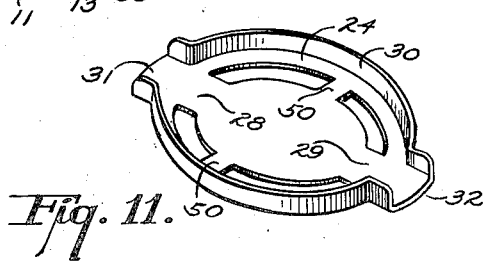
Fig. 11 is a perspective view showing a variation of the locking adapter of Fig. 7 to be used in connection with the cup Fig. 10.

Figures 10 and 11 illustrate a possible variation in the method of attaching the adapter 24 to the cup 11. In this variation the cup 11 has formed in the skirt portions 21 the bayonet notches 49 which are adapted to receive the ears 50 of the adapter 24 (Fig. 11). The bayonet joint is completed in the cup 11 by the cam portions 51, the steps 52 and the neck or tension portions 53. In applying the adapter 24 to the cup 11 the ears 50 are placed in the notches 49 and rotated beneath the cams 51. The action of the cam 51 on the ear 50 causes the neck portion to spring slightly, thus permitting the ear 50 to pass thereunder. When the ear 50 has moved sufficiently the edge thereof passes the step 52. Said step permits the neck portion 53 to spring back into place thus preventing backward rotation of the ears 50 and consequently the adapter 24 is fastened rigidly and permanently in place.

For further illustration the typical filler spout 38 is shown which has thereon a sealing surface 39, flanges 40 and 41 separated by entrance slots 42 and 43. Depending from the flanges 40 and 41 are the cams 44 and 45 having at one end of each the stops 46 and 47.

The sealing means 48 may be of any dependable type such as rubber or fibre with a spring disc moulded therein, or it may be made of a spring disc and a fibre disc, or even a gasket of such material as would have an inherent resiliency.

Figure 2:
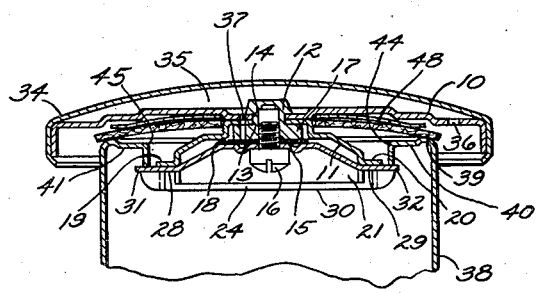
Fig. 2 is a sectional view of the device taken on line 2—2 of Fig. 1 with the vent closed.
Figure 5:
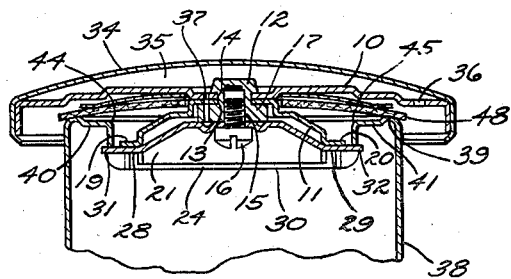
Fig. 5 is a sectional view similar to Fig. 2 except vent shown open.
Figure 3:
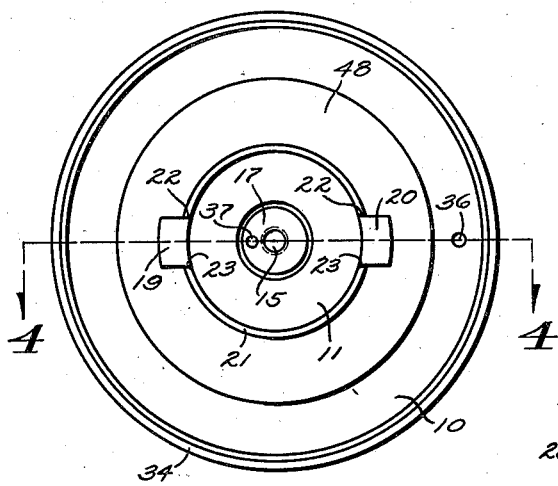
Fig. 3 is a bottom view of the device with an adapter removed.
Figure 6:
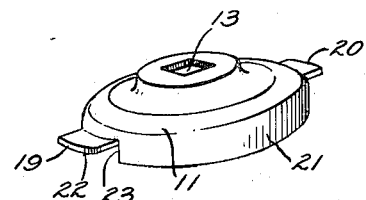
Fig. 6 is a perspective view of the locking and driving cup.
Figure 7:
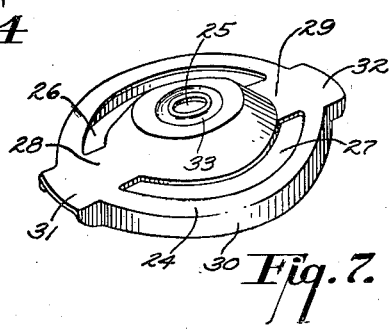
Fig. 7 is a perspective view of an adapter designed to fit the cup in Fig. 6.
Figure 4:
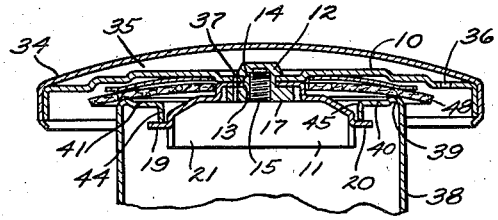
Fig. 4 is a sectional view taken on line 4—4 of Fig. 3.
Figure 8:
Fig. 8 is a perspective view of the gasket used in Fig. 2 to close the vent.
Figure 9:
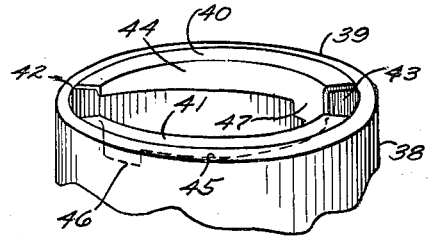
Fig. 9 is a perspective view of a conventional type bayonet filler spout.

To further illustrate the device, Fig. 4 discloses the device as it would appear when installed on a conventional filler spout of comparatively small diameter, and Fig. 2 discloses the device as it would appear when installed on a conventional filler spout somewhat larger in diameter than that of Fig. 4.

While I have shown the preferred form of my invention as known to me it will be understood that various changes in the combination, construction and arrangement of the parts may be made by those skilled in the art without departing from the spirit of the invention as claimed.

Having thus described my invention, what I claim and desire to secure by Letters Patent is;

1. In a universal closure for receptacles having bayonet filler necks of different diameters, a cap, sealing means carried by said cap, locking means carried by said cap non-rotatively thereof comprising a pair of locking members each corresponding to a different filler neck diameter, one of said locking members being fixed to said cap and having bayonet ears thereon for cooperative engagement with one of said filler necks, the other locking member being detachable and having bayonet ears thereon lying in substantially the same plane and extending substantially beyond the ears of the fixed locking member and adapted for cooperative engagement with a larger size filler neck, whereby the closure may be attached to one size filler neck and with the detachable locking member removed the closure may be attached to another size filler neck.

2. In a universal closure for receptacles having bayonet filler necks of different diameters, a cap, sealing means carried by said cap, locking means carried by said cap non-rotatively thereof comprising a pair of locking members each corresponding to a different filler neck diameter, one of said locking members being fixed to said cap and having bayonet ears thereon for cooperative engagement with one of said filler necks, the other locking member being detachable and having ears thereon extending substantially beyond the ears of the fixed locking member for cooperative engagement with a larger size filler neck, cooperating means on said locking members for spacing them in a predetermined relationship whereby the closure may be attached to one size filler neck and with the detachable locking member removed the closure may be attached to another size filler neck.

3. In a universal closure for receptacles having bayonet filler necks of different diameters, a cap, sealing means carried by said cap, locking means carried by said cap non-rotatively thereof comprising a pair of locking members each corresponding to a different filler neck diameter, one of said locking members being fixed to said cap and having bayonet ears thereon for cooperative engagement with one of said filler necks, the other locking member being detachable and having bayonet ears thereon extending substantially beyond the ears of the fixed locking member and adapted for cooperative engagement with a larger size filler neck, cooperating means on the locking members for definitely spacing the members and preventing relative rotation therebetween, whereby the closure may be attached to one size filler neck and with the detachable locking member removed the closure may be attached to another size filler neck.

4. In a universal closure for receptacles having bayonet filler necks of different diameters, a cap, sealing means carried by said cap, locking means carried by said cap non-rotatively thereof comprising a pair of locking members corresponding to a pair of filler necks of different diameters, one of said locking members being fixed to said cap and having bayonet ears thereon for cooperative engagement with one of said filler necks, the other locking member being detachable and having bayonet ears thereon for cooperative engagement with the other filler neck, cooperating means on the locking members for definitely spacing said detachable member relative to said sealing means, the ears of the detachable locking member extending substantially beyond the ears of the fixed locking member whereby the closure may be securely attached to one size filler neck and with the detachable locking member removed the closure may be securely attached to another size filler neck.

5. In a universal closure for receptacles having bayonet filler necks of different diameters, a cap, sealing means carried by said cap, bayonet locking means carried by said cap non-rotatively thereof comprising a pair of locking members corresponding to a pair of filler necks of different diameters, a pair of bayonet ears on each locking member for bayonet engagement with their respective filler necks, one pair of bayonet ears extending substantially beyond the other pair for engaging a larger size filler neck, said ears being located in predetermined relative planes for producing substantially uniform sealing pressure on both sizes of filler necks, means on one of said locking members for engaging the other to space said members and to prevent relative rotation thereof, one of said members being fixed to said cap and the other being detachably carried by the cap, whereby the closure may be attached to one size filler neck and with the detachable locking member removed the closure may be attached to another size filler neck.

6. In a universal closure for receptacles having bayonet filler necks of different diameters, a cap, sealing means carried by said cap for engaging the different sized filler necks, bayonet locking means carried by said cap non-rotatively thereof comprising a pair of substantially different sized locking members each corresponding to one of said filler necks, one of said bayonet locking members having ears thereon and being fixed to said cap rigidly and non-rotatively thereof and the other also having bayonet ears thereon but being detachably carried by the cap telescoping the fixed locking member and having means thereon for engaging the fixed locking member for spacing the members in predetermined relationship and preventing relative rotation thereof, the bayonet ears of the detachable locking member extending substantially beyond the ears of the fixed locking member, whereby the closure may be attached to one size filler neck and with the detachable locking member removed the closure may be attached to another size filler neck.

KYLE E. STANT.